United States Patent
Zuhlsdorf et al.

(10) Patent No.: US 10,086,885 B2
(45) Date of Patent: Oct. 2, 2018

(54) UNDERBODY AIR SPAT

(71) Applicant: Toyota Motor Engineering & Manufacturing North America, Inc., Erlanger, KY (US)

(72) Inventors: Joseph D. Zuhlsdorf, Surprise, AZ (US); Tommy E. Stubblefield, Surprise, AZ (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 7 days.

(21) Appl. No.: 15/095,123

(22) Filed: Apr. 10, 2016

(65) Prior Publication Data

US 2017/0291649 A1    Oct. 12, 2017

(51) Int. Cl.
   *B62D 35/02*    (2006.01)
(52) U.S. Cl.
   CPC .................................. *B62D 35/02* (2013.01)
(58) Field of Classification Search
   CPC ....................................................... B62D 35/02
   USPC ...................................................... 296/180.1
   See application file for complete search history.

(56) References Cited

U.S. PATENT DOCUMENTS

| | | | |
|---|---|---|---|
| 4,810,021 A * | 3/1989 | Burst ........................ | B60T 5/00 296/180.1 |
| 5,511,847 A | 4/1996 | Weisbarth et al. | |
| 7,600,615 B2 * | 10/2009 | Ramsay ................... | B60T 5/00 188/264 AA |
| 8,678,426 B1 * | 3/2014 | Browne ................ | F16D 65/847 165/44 |

FOREIGN PATENT DOCUMENTS

| | | | | |
|---|---|---|---|---|
| DE | 102006044952 A1 * | 4/2008 | ............... | B60T 5/00 |
| DE | 102007051496 A1 | 4/2009 | | |

* cited by examiner

*Primary Examiner* — Joseph D. Pape
*Assistant Examiner* — Dana D Ivey
(74) *Attorney, Agent, or Firm* — Christopher G. Darrow; Darrow Mustafa PC

(57) ABSTRACT

A vehicle includes an underbody opening to a wheel well, a wheel accommodated in the wheel well, a brake inside the wheel and an air spat at the underbody. The air spat has an upright Coanda surface open to free oncoming underbody airflow. The Coanda surface includes a trailing section aimed inside the wheel and at the brake.

20 Claims, 4 Drawing Sheets

UNDERBODY AIR SPAT

TECHNICAL FIELD

The embodiments disclosed herein generally relate to vehicles, and more specifically to their underbody air spats.

BACKGROUND

Some vehicles include underbody air spats. These air spats are used to change the motion of free oncoming underbody airflow to support various types of performance of the vehicle or its components.

SUMMARY

Disclosed herein are embodiments of vehicles and their underbody air spats. In one aspect, a vehicle includes an underbody opening to a wheel well, a wheel accommodated in the wheel well, a brake inside the wheel and an air spat at the underbody. The air spat has an upright Coanda surface open to free oncoming underbody airflow. The Coanda surface includes a trailing section aimed inside the wheel and at the brake.

In another aspect, a vehicle includes an underbody opening to a wheel well, a wheel accommodated in the wheel well, a brake inside the wheel and an air spat adjacent a front of the wheel. The air spat is constructed as an upright flange, and has a stem extending rearward toward an inboard side of the wheel whose outside is open to, and convexly contoured to, free oncoming underbody airflow. A Coanda surface is defined along the outside of the stem. The Coanda surface includes a trailing section aimed inside the wheel and at the brake.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an underbody air spat for a vehicle. The air spat, among other things, improves brake cooling performance by redirecting, under the Coanda effect, free oncoming underbody airflow inside a vehicle's wheel and at its brake.

Figure 1:
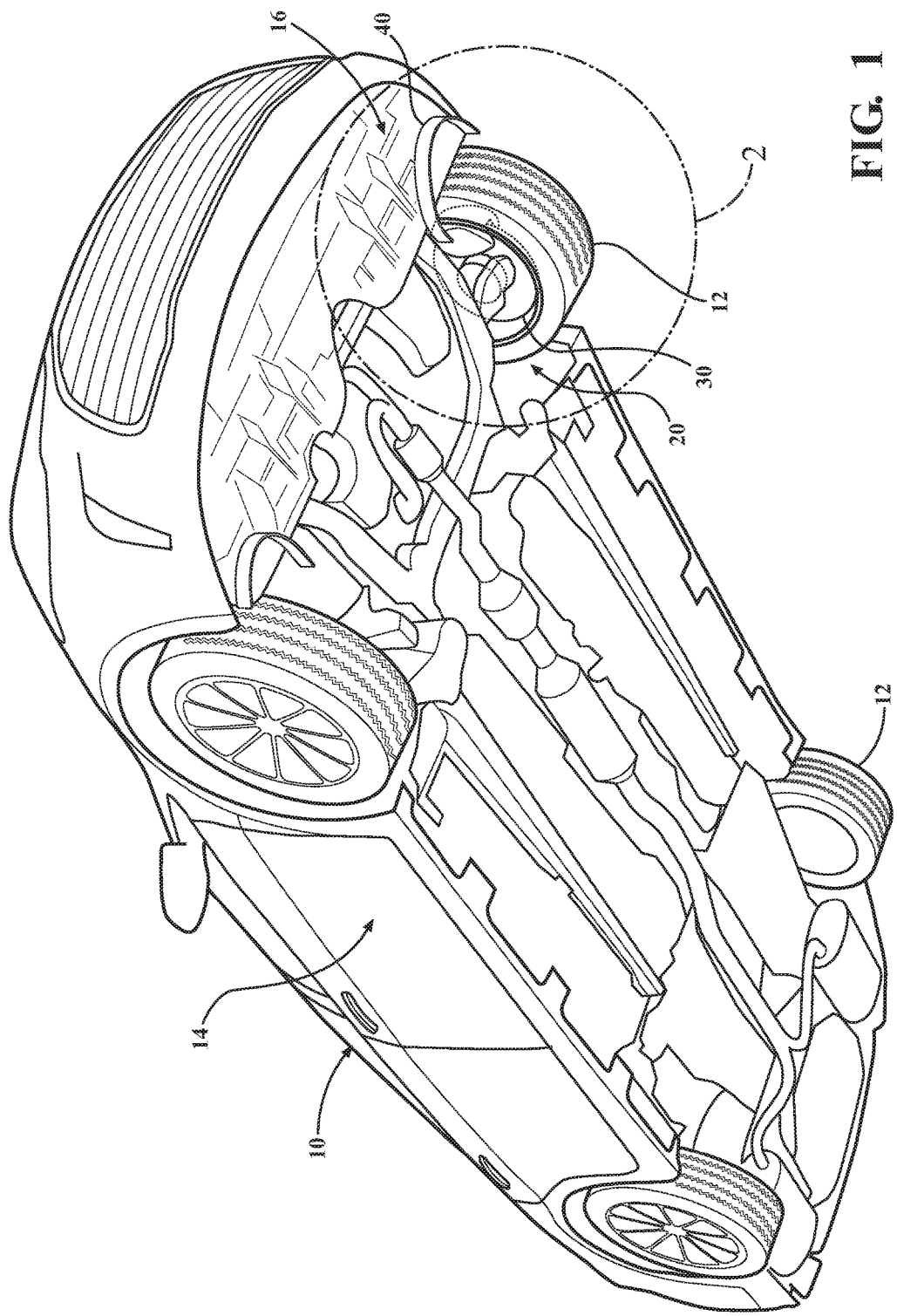
FIG. 1 is a bottom perspective view of a vehicle, showing its underbody as well as, for a representative front driver's side wheel, a wheel well accommodating the wheel, a brake inside the wheel and an underbody air spat for the wheel.

A representative vehicle 10 is shown in FIG. 1. In this description, uses of "front," "forward" and the like, and uses of "rear," "rearward" and the like, refer to the longitudinal direction of the vehicle 10. "Front," "forward" and the like refer to the front (fore) of the vehicle 10, while "rear," "rearward" and the like refer to the back (aft) of the vehicle 10.

The vehicle 10 has an exterior and a number of inner compartments. The inner compartments may include a passenger compartment, an engine compartment and, for the illustrated vehicle 10, a trunk. The vehicle 10 may include, among other things, an engine, motor, transmission and other powertrain components housed in its engine compartment or elsewhere in the vehicle 10, as well as other powertrain components, such as wheels 12.

The wheels 12 support the remainder of the vehicle 10. The vehicle 10 may include four wheels 12, including two front wheels 12 and two rear wheels 12. One, some or all of the wheels 12 may be powered by other powertrain components to drive the vehicle 10.

The vehicle 10 has a body 14 and an underbody 16. The body 14 forms the exterior of the vehicle 10 and defines its interior compartments. The body 14 may have, among other things, a floor, upright sides with doors, and a front end. Each of the wheels 12 may be accommodated in a wheel well 20 opening between the body 14 and the underbody 16. Each of the wheel wells 20 is framed, at the body 14, by the upright sides, as well as, at the underbody 16, by any combination of a floor structure for the floor of the body 14 and various underbody coverings.

Figure 2:
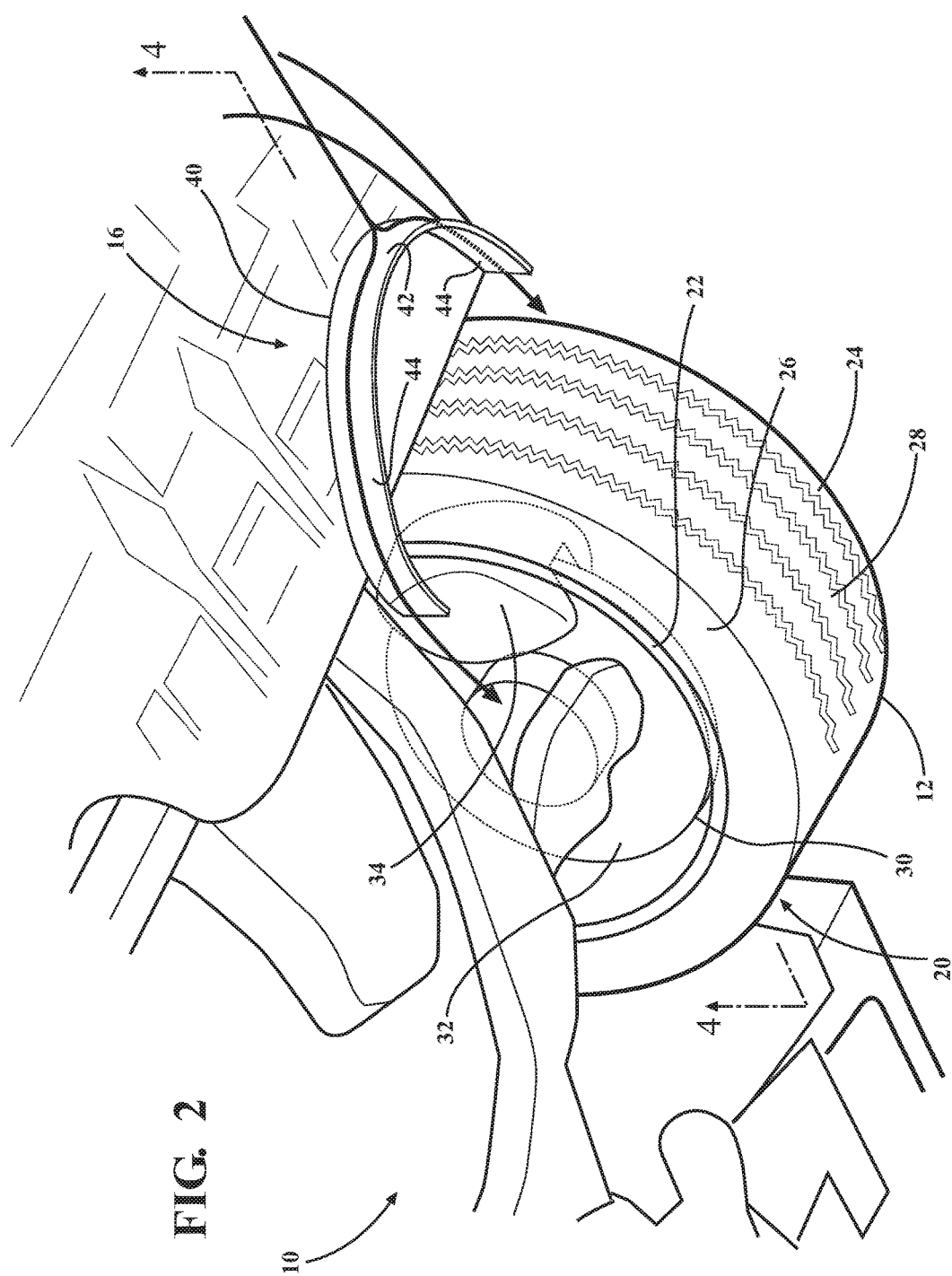
FIG. 2 is an enlarged partial bottom perspective view of the portion of the vehicle identified as 2 in FIG. 1 and including the wheel and its underbody air spat.

As shown with additional reference to FIG. 2, for a representative front driver's side wheel 12, the wheel 12 has a rim 22 and a tire 24 installed on the outside of the rim 22. The tire 24 has sidewalls 26 at the inboard and outboard sides of the wheel 12, as well as a tread 28 connected between the sidewalls 26.

In addition to the wheel 12, the vehicle 10 includes a brake 30 associated with the wheel 12. The brake 30 is located inside the wheel 12, shrouded by the inside of the rim 22. The brake 30 includes a brake rotor 32 and a brake caliper 34 for the brake rotor 32. The brake rotor 32 is mounted to the remainder of the vehicle 10 for rotation with the wheel 12, while the brake caliper 34 is mounted in place to the remainder of the vehicle 10.

When the vehicle 10 is driven, free airflow is induced across the underbody 16 as a result of relative movement between the vehicle 10 and surrounding ambient air. In forward operation of the vehicle 10, much if not all of this free underbody airflow is rearward and, accordingly, oncoming to the vehicle 10 in its longitudinal direction.

The vehicle 10 includes one or more air spats 40 located at the underbody 16. These air spats 40 may include respective air spats 40 for one, some or all of the wheels 12. Although this description follows with reference to the air spat 40 for the representative front driver's side wheel 12, this disclosure is applicable in principle to similar air spats 40 for other wheels 12, including without limitation the front passenger's side wheel 12.

Figure 3:
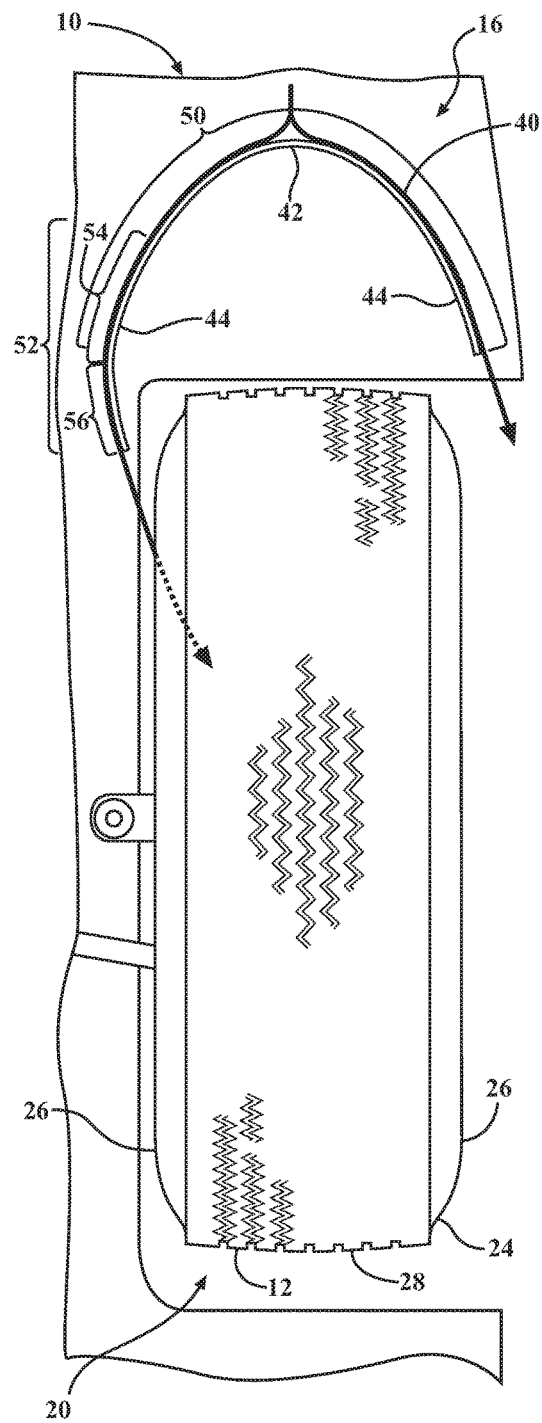
FIG. 3 is a bottom plan view of the vehicle, further showing the wheel and its underbody air spat.
Figure 4:
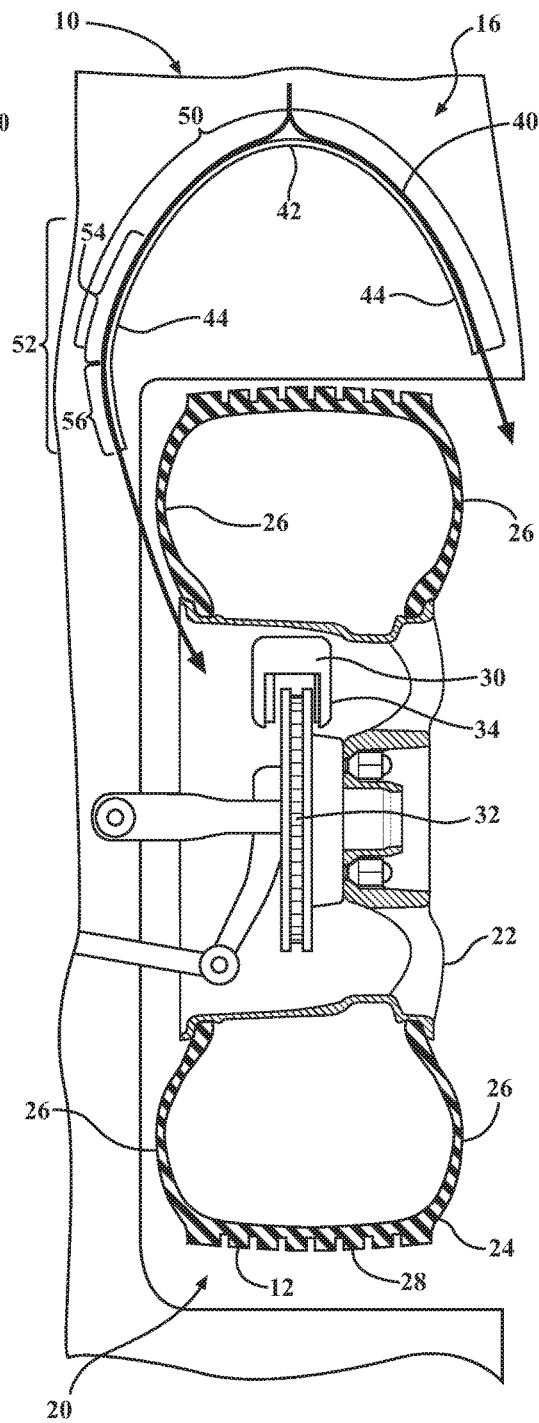
FIG. 4 is a cross sectional view of the vehicle taken along the line 4-4 in FIG. 2, further showing the wheel and its underbody air spat, as well as the brake.

As shown with additional reference to FIGS. 3 and 4, the air spat 40 is located adjacent to the front of the wheel 12. The air spat 40 may have any number of active exterior surfaces open to free oncoming underbody airflow. The active exterior surfaces may be configured to redirect, deflect or otherwise change the motion of free oncoming underbody airflow. By doing so, the air spat 40 and its active exterior surfaces may improve or otherwise support any number of various cooling, aerodynamic or other types of performance of the vehicle 10 or its components and, more specifically, the wheel 12 and other components associated with the wheel 12.

In its illustrated configuration, the air spat 40 is constructed as an upright, generally C-shaped flange extending from the remainder of the underbody 16, and its active exterior surfaces are defined along its outside. In this or other configurations, the air spat 40 may be part of the underbody 16 or a separate component attached to the remainder of the underbody 16.

The air spat 40 has an apex 42 extending in front of, and laterally across, the wheel 12, and opposed stems 44 extending rearward toward the wheel 12. One of the stems 44 extends rearward toward the inboard side of the wheel 12, while the other of the stems 44 extends rearward toward the outboard side of the wheel 12. The stem 44 that extends rearward toward the inboard side of the wheel 12 extends, more specifically, to the inboard side of the wheel 12, and in front of the brake 30. The outside of the air spat 40 and, by extension, the active exterior surfaces defined along the outside of the air spat 40, are convexly contoured to free oncoming underbody airflow.

The active exterior surfaces of the air spat 40 may include an upright forward facing surface 50 located in front of the wheel 12, as well as an upright Coanda surface 52 located in front of the brake 30. In the illustrated configuration of the air spat 40, its forward facing surface 50 is defined, at least, along the outside of its apex 42, while its Coanda surface 52 is defined, at least, along the outside of the stem 44 that extends rearward toward the inboard side of the wheel 12.

In some cases, as shown, the forward facing surface 50 may contiguously blend into the Coanda surface 52. In these cases, parts of the forward facing surface 50 may overlap with parts of the Coanda surface 52, and vice versa, or, the forward facing surface 50 and the Coanda surface 52 could be mutually exclusive, but adjacent. In other cases, there could be one or more intermediate surfaces between the forward facing surface 50 and the Coanda surface 52.

With the forward facing surface 50 of the air spat 40 defined along the outside of its apex 42, the forward facing surface 50 is located in front of, and laterally across, the wheel 12. In forward operation of the vehicle 10, with the forward facing surface 50 convexly contoured to free oncoming underbody airflow, it operates to smoothly redirect free oncoming underbody airflow around the wheel 12. Since this free oncoming underbody airflow would otherwise become incident on the wheel 12, the air spat 40 and its forward facing surface 50 may, among other things, improve vehicle aerodynamic performance.

With the Coanda surface 52 of the air spat 40 defined along the outside of the stem 44 that extends rearward toward the inboard side of the wheel 12, the Coanda surface 52 is located, at least in part, to the inboard side of the wheel 12, and in front of the brake 30. In forward operation of the vehicle 10, with the Coanda surface 52 convexly contoured to resulting free oncoming underbody airflow, it operates to smoothly redirect free oncoming underbody airflow inside the wheel 12 and at the brake 30. Since this free oncoming underbody airflow would otherwise pass the inside of the wheel 12, the air spat 40 and its Coanda surface 52 may, among other things, improve brake cooling performance.

The Coanda surface 52 employs the Coanda effect to lead attached free oncoming underbody airflow along its convex contour. Attached free oncoming underbody airflow, in other words, follows the convex contour of the Coanda surface 52 under the Coanda effect.

The Coanda surface 52 includes a leading section 54 forward of a trailing section 56, with the leading section 54 of the Coanda surface 52 being the closest to the forward facing surface 50.

The leading section 54 of the Coanda surface 52 is permissive of the attachment of free oncoming underbody airflow to itself and to the remainder of the Coanda surface 52. In cases where, as shown, the forward facing surface 50 contiguously blends into the Coanda surface 52, the blended parts of the forward facing surface 50 may be permissive of the initial attachment of free oncoming underbody airflow. In these cases, to permit the initial attachment of free oncoming underbody airflow, as opposed to its deflection, the blended parts of the forward facing surface 50 may be generally oriented with free oncoming underbody airflow. The leading section 54 of the Coanda surface 52 may, in turn, be permissive of the maintenance of the attachment of free oncoming underbody airflow. In other cases, the leading section 54 of the Coanda surface 52 itself may be generally oriented with free oncoming underbody airflow to permit the initial attachment of free oncoming underbody airflow, as opposed to its deflection.

Attached free oncoming underbody airflow follows the convex contour of the remainder of the Coanda surface 52 and, more specifically, of the trailing section 56 of the Coanda surface 52, under the Coanda effect. The trailing section 56 of the Coanda surface 52 is located to the inboard side of the wheel 12, and in front of the brake 30. The trailing section 56 of the Coanda surface 52 is, moreover, aimed inside the wheel 12 at the brake 30. Accordingly, attached free oncoming underbody airflow, after following the convex contour of the trailing section 56 of the Coanda surface 52 under the Coanda effect, detaches from the trailing section 56 of the Coanda surface 52 and flows across the sidewall 26 of the tire 24 at the inboard side of the wheel 12, and inside the wheel 12 at the brake 30.

Figure 5:
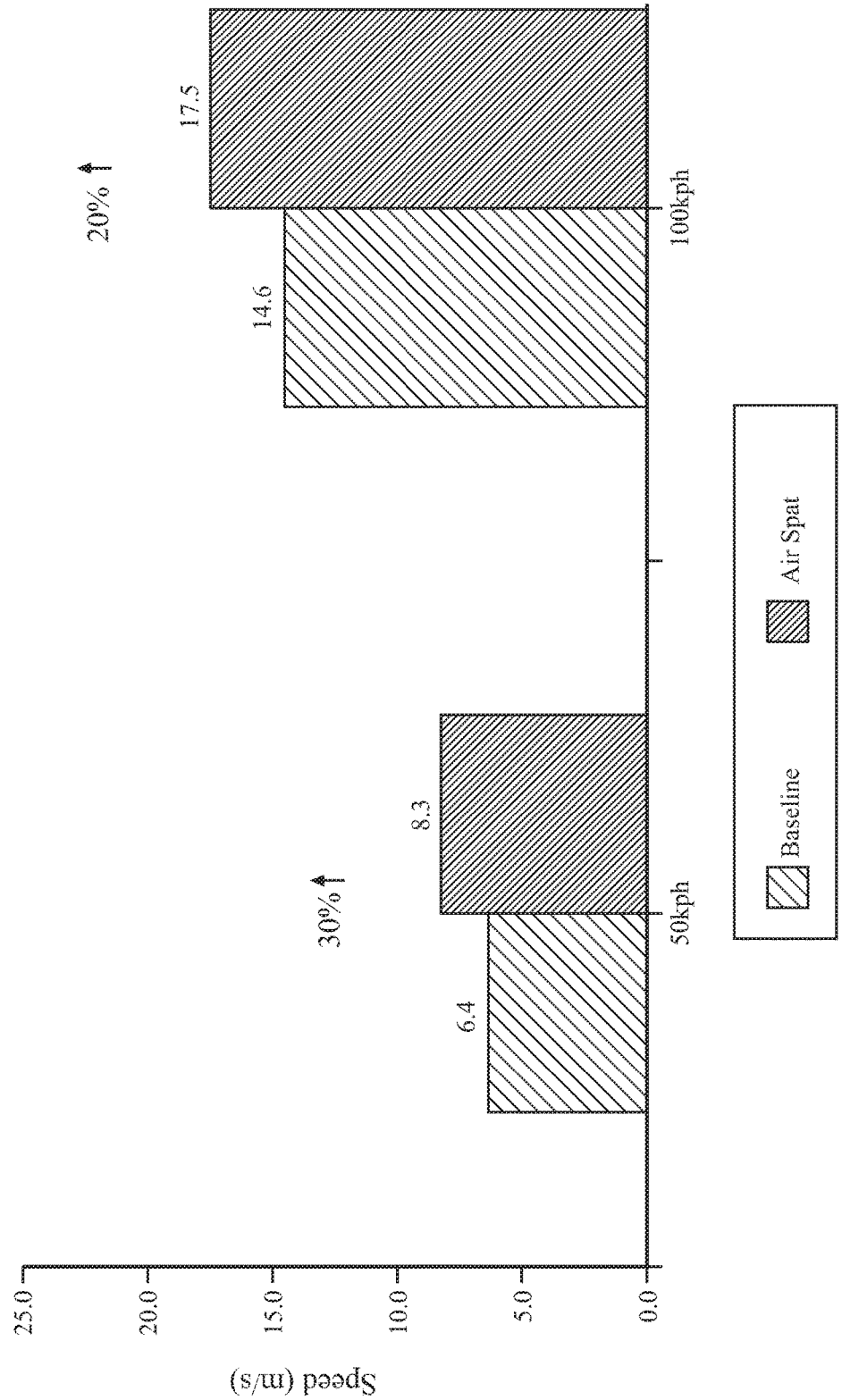
FIG. 5 depicts a comparison of airflow measurements at the brake in the vehicle with the air spat and in an otherwise similar vehicle without the air spat.

As shown with additional reference to FIG. 5, as reflected by increased airflow measurements at the brake 30 in a vehicle 10 with the air spat 40 compared to an otherwise similar vehicle without the air spat 40, it has been identified in testing that the air spat 40 and its Coanda surface 52 redirects free oncoming underbody airflow, that would otherwise pass the inside of the wheel 12, inside the wheel 12 and at the brake 30. The air spat 40 and its Coanda surface 52 may accordingly, among other things, improve brake cooling performance. It has further been identified the air spat 40 and its Coanda surface 52, by its smooth redirection of free oncoming underbody airflow inside the wheel 12 and at the brake 30, may moreover have minimal if any negative impact on the improved vehicle aerodynamic performance effected by the air spat 40 and its forward facing surface 50.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
an underbody opening to a wheel well;
a wheel accommodated in the wheel well;
a brake inside the wheel; and
an air spat at the underbody adjacent a front of the wheel,
the air spat having an upright Coanda surface open to free oncoming underbody airflow, the Coanda surface including a trailing section aimed inside the wheel and at the brake.

2. The vehicle of claim 1, wherein the Coanda surface is located in front of the brake.

3. The vehicle of claim 1, wherein the trailing section is located to an inboard side of the wheel, and in front of the brake.

4. The vehicle of claim 1, wherein the Coanda surface includes a leading section forward of the trailing section, the leading section oriented with free oncoming underbody airflow to permit its attachment thereto.

5. A vehicle, comprising:
an underbody opening to a wheel well;
a wheel accommodated in the wheel well;
a brake inside the wheel; and
an air spat at the underbody, the air spat having an upright forward facing surface open to free oncoming underbody airflow, the forward facing surface located in front of, and laterally across, the wheel, and an upright Coanda surface open to free oncoming underbody airflow, the Coanda surface including a trailing section aimed inside the wheel and at the brake.

6. The vehicle of claim 5, wherein the forward facing surface is convexly contoured to free oncoming underbody airflow.

7. The vehicle of claim 5, wherein the forward facing surface contiguously blends into the Coanda surface.

8. The vehicle of claim 5, wherein the trailing section is located to an inboard side of the wheel, and in front of the brake.

9. The vehicle of claim 5, wherein the Coanda surface includes a leading section forward of the trailing section, the leading section oriented with free oncoming underbody airflow to permit its attachment thereto.

10. A vehicle, comprising:
an underbody opening to a wheel well;
a wheel accommodated in the wheel well;
a brake inside the wheel; and
an air spat adjacent a front of the wheel, the air spat constructed as an upright flange, and having a stem extending rearward toward an inboard side of the wheel whose outside is open to, and convexly contoured to, free oncoming underbody airflow, with a Coanda surface defined along the outside of the stem, the Coanda surface including a trailing section aimed inside the wheel and at the brake.

11. The vehicle of claim 10, wherein the stem and its Coanda surface are located in front of the brake.

12. The vehicle of claim 10, wherein the trailing section is located to an inboard side of the wheel, and in front of the brake.

13. The vehicle of claim 10, wherein the Coanda surface includes a leading section forward of the trailing section.

14. The vehicle of claim 13, wherein the leading section is oriented with free oncoming underbody airflow to permit its attachment thereto.

15. The vehicle of claim 10, wherein the air spat has an apex extending in front of, and laterally across, the wheel, whose outside is open to free oncoming underbody airflow, with a forward facing surface defined along the outside of the apex.

16. The vehicle of claim 15, wherein the apex's outside is convexly contoured to free oncoming underbody airflow.

17. The vehicle of claim 15, wherein the stem extends from the apex rearward toward the inboard side of the wheel.

18. The vehicle of claim 15, wherein the air spat has another opposing stem extending rearward toward an outboard side of the wheel.

19. The vehicle of claim 10, wherein the air spat is constructed as an upright flange extending from the remainder of the underbody.

20. The vehicle of claim 10, wherein the air spat is constructed as an upright, generally C-shaped flange, and has:
an apex extending in front of, and laterally across, the wheel, whose outside is open to free oncoming underbody airflow, with a forward facing surface defined along the outside of the apex,
the stem extending from the apex rearward toward the inboard side of the wheel, and
another opposing stem extending from the apex rearward toward an outboard side of the wheel.

* * * * *